1,943,451

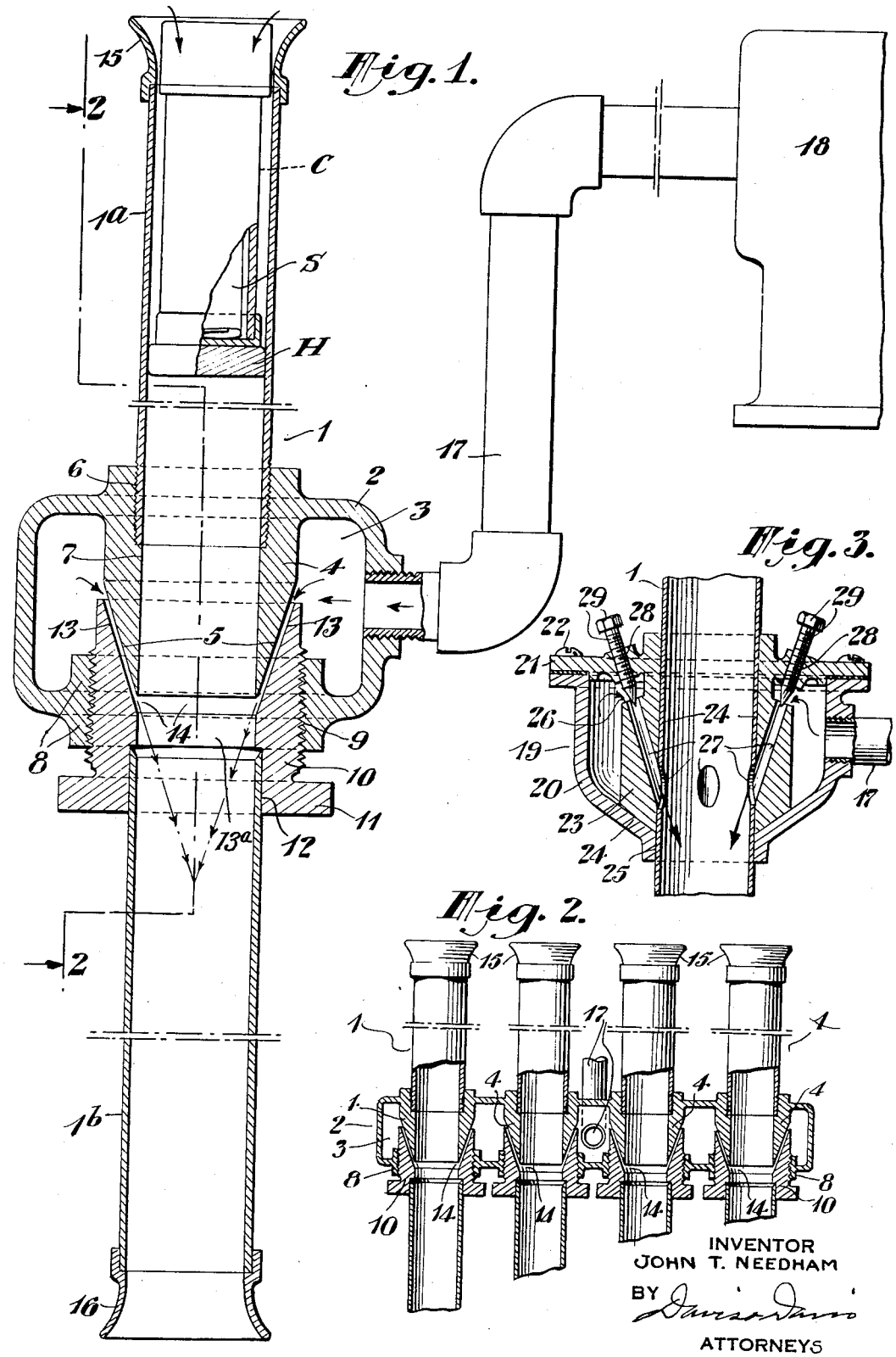
Jan. 16, 1934.  J. T. NEEDHAM  1,943,451
PNEUMATIC DISPATCH TUBE APPARATUS
Filed Aug. 23, 1930
INVENTOR
JOHN T. NEEDHAM
BY
ATTORNEYS Patented Jan. 16, 1934

UNITED STATES PATENT OFFICE 1,943,451

PNEUMATIC DISPATCH TUBE APPARATUS

John T. Needham, North Plainfield, N. J., assignor to General Conveyors Limited, Montreal, Quebec, Canada, a corporation of Canada Application August 23, 1930. Serial No. 477,369

3 Claims. (Cl. 243—25)

Important objects of the present invention are, to provide improved means for causing a flow of air through a pneumatic dispatch tube to propel the carriers therealong; to provide a dispatch tube apparatus wherein a carrier-propelling flow of air through a dispatch tube is satisfactorily produced by the injection of air into the tube at an intermediate point in its length; to provide improved injector means for this purpose; and, to provide for the adjustment of said injector means to vary the flow of injected air.

In the drawing, Fig. 1 is a longitudinal sectional view of a dispatch tube apparatus embodying my invention;

Fig. 2 a section taken on the line 2—2 of Fig. 1, upon a reduced scale; and

Fig. 3 a sectional view of another form of injector device.

My improvement is illustrated in the present instance as applied to a plurality of pneumatic dispatch tubes 1. It includes an elongated, box-like casing 2 which defines an air chamber 3 and is connected to the tubes at an intermediate point between their sending terminals and their discharge terminals and preferably nearer the sending terminals. The upper wall of the casing is integrally formed with a row of nozzle projections 4 which project downward for a material distance within the casing. Each nozzle is formed with a conical exterior surface 5 tapering downward to its lower end. At the upper end of each nozzle the casing is formed to receive an end of a dispatch tube section 1ª. A threaded connection 6 is shown between the tube and casing but they may be joined in any suitable manner. Extending downwardly through the nozzle from said connection is a smooth bore 7 forming a continuation of the carrier passage in the tube. Along its lower wall the casing is integrally formed with a row of bosses 8 vertically alining with the nozzles and each formed with a threaded aperture 9. A threaded sleeve 10 is screwed upward through each aperture 9. These sleeves form connections with second tube sections and combine with the nozzles 4 to form air injectors.

The lower end of each sleeve 10 is formed with a head 11 for turning it, and with a bore 12 into which an end of a second dispatch tube section 1ᵇ is fitted. Formed within the sleeve is a downwardly tapering conical surface 13 opposed to the conical surface 5 of the nozzle and surrounding it. Between said conical surface and the connection with tube section 1ᵇ the sleeve is formed with a short, smooth bore 13ª flush with the interior of the tube and with the nozzle bore 7 and forming part of the carrier passage. The conical surfaces are both of considerable depth. They have the same degree of taper and, between them, they define an injector port 14 entirely surrounding the carrier passage of the tube line, leading obliquely inward from the air chamber 3 to said passage, and along the latter in the direction of carrier transmission. The taper of the port surfaces makes quite a low angle with the passage in order to give positive longitudinal direction to the air injection. Adjustment of the size of the injector port and the closing thereof is provided for by the threaded connection between sleeve 11 and the casing. By turning the sleeve the space between the opposed conical port walls may be varied. The connection between the sleeve and the tube section 6ª permits the sleeve to turn. The injector means is entirely outside of the carrier passage so that the latter is unobstructed.

Each upper tube section 1ª is provided as its upper or outer end with an open bell mouth 15 and forms the sending terminal of the tube. The lower or outer end of each tube section 1ᵇ is preferably provided with an open bell mouth 16 and forms the discharge terminal of the tube.

An air supply pipe 17 is connected to the casing 2 and leads from a source of air pressure, such as a blower or the like, indicated at 18. The pipe leads air under pressure to the chamber 3, from which it is injected into the tubes through the annular ports 14. A carrier C is provided to contain sheets S or other matter to be transmitted through the tube. The carrier comprises a tubular container body having a head H. The tube is formed to fit the head so that the carrier substantially fills the tube crosswise and constitutes a freely movable abutment in the tube. The injection of air into a tube 1 at a point between the sending terminal and the discharge terminal and away from the former causes a suction in the upper tube section. When the carrier is inserted into the tube through the bell mouth sending terminal 15 it forms a freely movable partition in the line separating the atmospheric pressure admitted at the sending station from the low pressure created by the injector. The low pressure created by the injection at a point advanced along the line causes the atmospheric pressure to impel the carrier rapidly along the first reach of the tube to a point in advance of the injector port. Here the carrier separates the high pressure injected air from the atmospheric pressure in advance of the carrier and the thrust of the injected air rapidly impels the carrier to the receiving station. Thus the tube line embodies a pressure-vacuum principle. The carrier is impelled by vacuum and pressure successively and both are created efficiently by the injection at an intermediate point in the line. Both terminals are in the present instance, constantly open and there is preferably a constant delivery of air through pipe 17 to the chamber 3. This system is well adapted for use in plants where a constant supply of air under pressure is provided for other purposes and economy in its use is not required. The system eliminates the usual electrical means for operating a timer and starting a motor and a blower to build up air pressure each time that a carrier is to be transmitted. Furthermore there are no doors to be opened at the sending terminals for the insertion of the carriers. While there is a constant flow of carrier-propelling air through the dispatch tubes it is directed away from the sending terminals so that it cannot blow through them. The flow of air through the injector ports 14 may be readily varied according to the requirements by turning the sleeves 10. The sleeves of the different tubes are independently adjustable so that the injection of air into each tube may be regulated in accordance with the length of the tube. It is also possible to entirely close the injector port of any one of the tubes, by screwing the sleeve 10 against the conical surface of the nozzle 5 and thereby cut off the tube from the air supply.

A modified form of injector device is shown in Fig. 3. Here the air supply chamber is formed by a casing 19 formed of a body section 20 open at the top and closed by a flat cover section 21 which is detachably fastened to the body section as at 22. A row of tubular extensions 23 are formed upon the cover section and extend downward within the casing. Each extension 23 is beveled at its lower end, as at 24, and snugly fits the bottom of the casing, which is downwardly tapered. A central bore 24 is formed in the extension and registers with an aperture 25 in the casing bottom. The dispatch tube 1 is fitted in said bore and aperture and extends through the casing without interruption. Directly beneath the cover 21 each extension 23 is reduced in diameter and formed with an inclined annular shoulder 26. From said shoulder a plurality of injector ports 27 are drilled obliquely downward and inward through the extension and through the tube 1. These ports are equally spaced around the tube and each inclines at a low angle to the tube line. In the cover 21 a plurality of apertures 28 are tapped. These apertures are in alinement with the ports 27 and they incline correspondingly to the latter. A headed screw 29 is screwed into each aperture and is formed with a tapered inner end to enter the alining port and restrict the entrance thereof. By turning the screws 29 the injection of air into the tube 1 may be varied within a wide range of adjustment.

While in the several forms of the invention the injectors are shown and described as directly downwardly, it will be understood that they may be directed upwardly or laterally according to the direction of the tube lines and the locations of the sending and discharge terminals.

What I claim is:

1. A pneumatic carrier dispatch tube apparatus comprising a dispatch tube line provided with a sending terminal for receiving carriers and a terminal for discharging carriers; a casing forming an air chamber surrounding the tube line at a point located between said terminals; a plurality of air injector ports spaced around the tube line and formed to admit air from said chamber to the dispatch tube and direct it along the latter in the direction of carrier transmission; and adjustable means to vary the flow of air through said ports.

2. A pneumatic dispatch tube apparatus comprising a plurality of dispatch tube lines each with a sending terminal for receiving carriers and a terminal for discharging carriers; a casing forming an air chamber surrounding said tube lines at a point between the terminals of each tube; injector ports formed and disposed to inject air from said chamber into the dispatch tubes and direct said air along the tubes in the direction of carrier transmission; and adjustable means to independently close and open the injector ports of the different tubes.

3. A pneumatic pressure-vacuum dispatch tube apparatus for transmitting carriers from a sending station to a receiving station by suction and pressure, comprising in combination, a dispatch tube line open for admission of air at the sending station and open for discharge of air at the receiving station and constantly unobstructed from end to end except for said carriers, an injector device to inject air into said line at an intermediate point between the sending and receiving station and positively direct it along the line toward the receiving station, means to supply said injector with air under pressure for forcible injection into the line in the direction of carrier travel to create a low pressure in the line between the sending station and the injector and to create a high pressure in the line between the injector and the receiving station, and a carrier forming a partition fitted in the dispatch tube and substantially filling it crosswise to constitute a freely movable abutment to first partition the tube between the sending station and the injection point and be subject to the suction created by the injection to impel it forward to the injector and to then partition the tube between the injector and the receiving station and be subject to the pressure of the injection thrust to impel it forward from the injector toward the receiving station.

JOHN T. NEEDHAM.